Nov. 7, 1944.  H. HOLLMANN ET AL  2,362,068
TANDEM WHEEL ASSEMBLY
Filed Feb. 24, 1943

Inventors
Hubert Hollmann
William G. Van Voorhis
By
Attorney

Patented Nov. 7, 1944

2,362,068

UNITED STATES PATENT OFFICE 2,362,068

TANDEM WHEEL ASSEMBLY

Hubert Hollmann, Findlay, and William G. Van Voorhis, Columbus, Ohio, assignors to The Buckeye Traction Ditcher Company, Findlay, Ohio, a corporation of Ohio Application February 24, 1943, Serial No. 476,926

2 Claims. (Cl. 180—22)

This invention relates to tandem wheel mountings particularly adapted for use in connection with trenching machines, and an object is to produce a tandem wheel assembly of this character which can be readily and conveniently mounted or removed, which is sturdy and reliable in construction, which affords new and improved axle supports for the wheels, which is particularly useful in connection with a differential gear drive and which is provided with the new and improved features of construction and arrangement hereinafter described.

Figure 1:
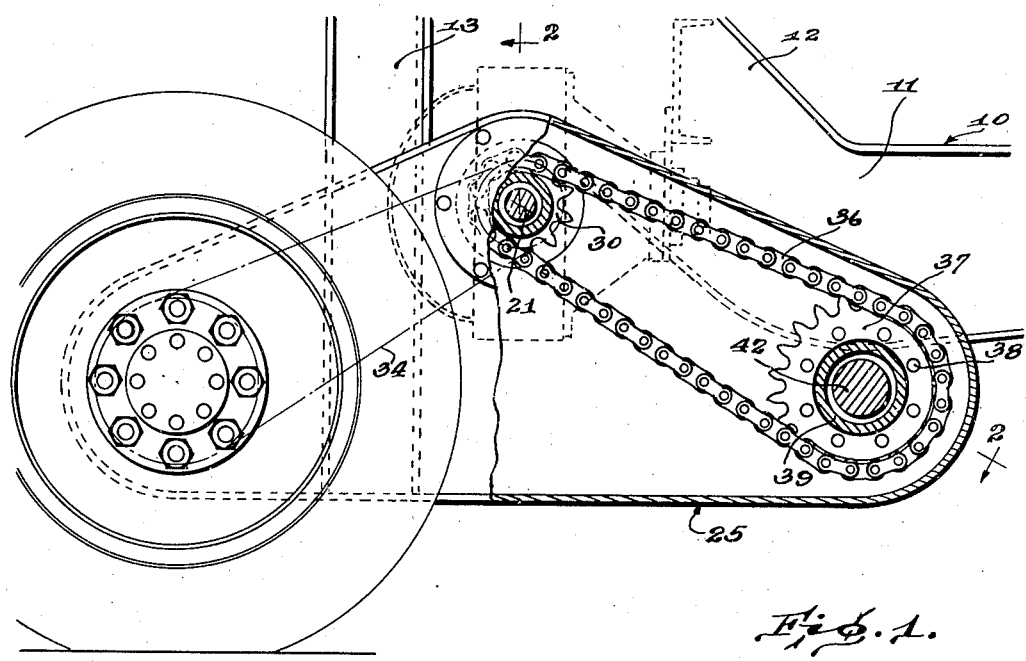
Figure 2:
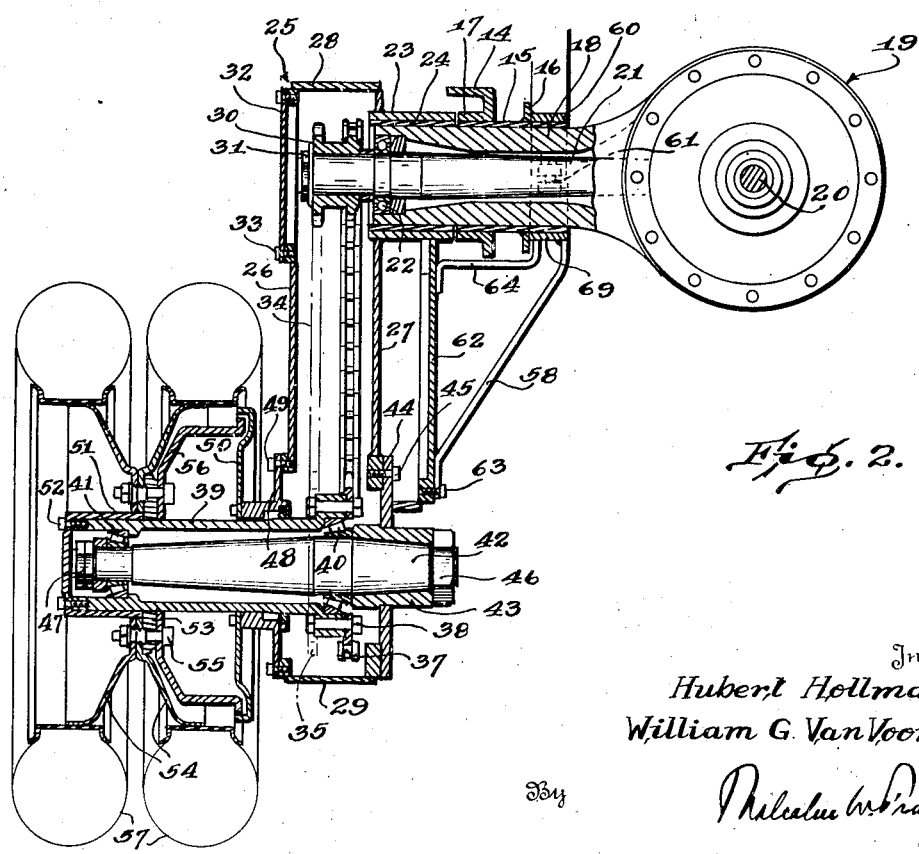

An embodiment of the invention is shown for purposes of illustration on the accompanying drawing in which Figure 1 is a fragmentary side elevation of a tandem wheel mounting, one of the wheels and a portion of the tandem housing being broken away for purposes of clarity; and Figure 2 is a vertical sectional view substantially on the line 2—2 of Figure 1.

The illustrated embodiment of the invention comprises a machine frame 10 there being shown a side frame member 11 having an upwardly inclined end portion 12, the rear end of which is secured to an upright elevator rail 13. It is to be understood that the frame 10 illustrated, represents the frame of a trenching machine on the rear end of which is suitably mounted a rotary digging wheel (not shown). At the front end of the machine are the usual steering wheels (not shown).

Suitably fixed to the side frame member 11 is a horizontally disposed angle bar 14 which is disposed in the region of the upper end portion of the upwardly inclined portion 12 of the side frame member. The angle bar 14 is apertured to receive a sleeve 15 which is welded to the angle bar. At the inner end of the sleeve is welded an abutment plate 16. Rigid with the outer end of the angle bar 14 is a ring 17. Fitting within the aperture of the angle bar 14 and fitting the sleeve 15 and ring 17, is a differential housing 18 which extends horizontally to the differential generally indicated at 19, the latter deriving its power from a longitudinal drive shaft 20 operatively connected to the power plate (not shown) carried by the machine.

Within the differential housing 18 is a differential shaft 21 suitably mounted in anti-friction bearings 22 disposed adjacent the outer end of the differential housing, the shaft 21 projecting outwardly beyond the end of the differential housing. Mounted on the outer end portion of the differential housing 18 is a sleeve or hub 23 of the tandem housing, and interposed between the sleeve 23 and the housing is a bushing 24. As shown, the tandem housing 25 is made up of vertically disposed side plates 26 and 27 to which are secured upper and lower plates 28 and 29 respectively. The upper end of the plate 27 is apertured to receive the outer end portion of the sleeve 23 to which it is welded. From the above description, it will be apparent that the tandem housing 25 can rock about the differential housing 18.

As indicated in Figure 1, the tandem housing 25 is generally triangular in shape and the upper portion of the triangle is rockably mounted on the differential housing. Fixed to the projecting end portion of the shaft 21 and arranged within the tandem housing is a double sprocket 30, one being employed to drive one of the wheels, and the other to drive the other wheel of the tandem. The sprocket member 30 is held in place by a lock nut 31 on the outer end of the shaft 21. It will be apparent that the diameter of the sprocket member 30 is slightly less than the diameter of the sleeve 23 so that the tandem housing and associated parts can be readily slipped off from the differential housing 18 without disturbing the sprocket member. To afford access to the sprocket member 30 and associated parts, a plate 32 is secured by bolts 33 to the side 26 of the tandem housing.

An endless chain 34 is trained over one of the sprockets in the sprocket member 30, and inclines downwardly and rearwardly to a somewhat larger sprocket 35. Trained over the other sprocket of the member 30 is an endless chain 36 which inclines downwardly and forwardly and engages a somewhat larger sprocket 37 at the forward end of the tandem housing 25. The mounting of the sprockets 35 and 37 and their associated axle and wheel assemblies are the same in each instance and it is deemed sufficient to describe in detail one of these assemblies.

As shown, the sprocket 37 is secured by a series of bolts 38 to the flanged end of a sleeve 39. The sleeve 39 is mounted on a pair of laterally spaced oppositely tapered roller bearing units 40 and 41, the inner races of which are secured to a stationary axle 42. As shown, the axle tapers inwardly from the roller bearing 40 at one end and the opposite end tapers inwardly and fitting the latter end portion is a relatively short sleeve 43 which is welded to a plate 44. The plate 44 is secured to the lower edge portion of the inner plate 27 of the tandem housing by a series of cap screws 45. On the inner end of the axle 42 is a lock nut 46 and on the outer end is a lock nut 47. Encircling the sleeve 39 on the outer side of the sprocket 37 is a brake adapter 48 which is secured to the outer panel 26 of the tandem housing by a series of bolts 49 and to the outer side of the adapter 48 is bolted a backing plate 50 on which the brake mechanism (not shown) is mounted.

Fitting over the outer end of the drive sleeve 39 is a wheel hub 51 and a series of bolts 52 secure the wheel hub to the sleeve 39. The hub 51 is formed with a flange 53 to which the wheels 54 are secured by a series of bolts 55. A brake drum 56 is secured in place by the bolts 55. Since the brake operating mechanism forms no part of the present invention, detail illustration and description thereof is not considered necessary. Mounted on the wheels 54 are the usual pneumatic tires 57.

From the above description it will be apparent that the sprocket member 30 is driven by the shaft 21 leading from the differential 19 and the chains 34 and 36 drive the sprockets 35 and 37. Each of these last mentioned sprockets drive the respective drive sleeve 39 to which the wheel hubs are fixed. When the wheels encounter irregularities in the road surface, the entire tandem unit is free to rock about the differential casing 18. As above mentioned, the entire unit can be removed from the differential shaft 21 by removing the chains 34 and 36 by obtaining access to the same by removal of the plate 32 and thereupon the entire tandem assembly can be slid off.

The tandem assembly is held against outward lateral movements along the differential housing 18 and for this purpose, a brace 58 is fixed at its upper end to a bushing half 69 which is on the under side of the differential shaft housing 18. The upper bushing half 60 engages the upper portion of the housing, these bushing halves being provided with flanges to receive bolts 61 for securing these parts in position. The brace 58 inclines downwardly and outwardly and the lower end portion is welded to a plate 62 which in turn is secured by cap screws 63 to an inwardly extending portion of the tandem housing. Braces 64 similarly connect the upper end of the plate 62 with the lower bushing half 69. It will be apparent that the bushing halves 69 and 60 abut against the inner side of the bracket plate 16 and thus prevent outward lateral movement of the tandem housing. In removing the tandem unit, it will be understood that the bolts 61 are first removed so that the upper bushing half or cap 60 can be first removed.

It is to be understood that numerous changes in details of construction, arrangement and operation may be effected without departing from the spirit of the invention especially as defined in the appended claims.

What we claim is:

1. A machine of the class described, a main frame, a transversely disposed operating shaft, a differential for driving said shaft and including a housing, a sleeve support forming a part of said differential housing and enclosing said operating shaft, the end portion of said operating shaft projecting beyond said sleeve support, a generally triangularly shaped tandem housing mounted for rocking movement upon said sleeve support and adapted to be slid therefrom, sprocket means fixed for rotation with said operating shaft, the parts being so proportioned that the tandem housing can be slipped from said sleeve support without removing said sprocket means, detachable means embracing said sleeve support and connected to said housing for retaining said tandem housing in place on said sleeve support but enabling rocking movement of the tandem housing, a pair of axles carried by and rigid with the lower portions of said tandem housing on opposite sides of said sprocket means, wheel hubs rotatable respectively on said axles, sprockets fixed to said wheel hubs, chain connections between said last sprockets and said sprocket means respectively, and wheels carried by said hubs respectively.

2. A machine of the class described and as claimed in claim 1 characterized in that bracket means carried by said main frame carries said sleeve support, and said tandem housing being disposed on one side of said bracket and said detachable retaining means upon the other side of said bracket.

HUBERT HOLLMANN.
WILLIAM G. VAN VOORHIS.